US012688788B2

(12) United States Patent
Landers

(10) Patent No.: US 12,688,788 B2
(45) Date of Patent: Jul. 21, 2026

(54) WEAPON TARGETING TRAINING SYSTEM AND METHOD THEREFOR

(71) Applicant: SINAB TECHNOLOGIES PTY LTD, Woolooware (AU)

(72) Inventor: Anthony James Landers, Woolooware (AU)

(73) Assignee: SINAB TECHNOLOGIES PTY LTD, Woolooware (AU)

( * ) Notice: Subject to any disclaimer, the term of this patent is extended or adjusted under 35 U.S.C. 154(b) by 266 days.

(21) Appl. No.: 18/666,656

(22) Filed: May 16, 2024

(65) Prior Publication Data

US 2024/0304102 A1     Sep. 12, 2024

Related U.S. Application Data

(63) Continuation of application No. 17/310,679, filed as application No. PCT/AU2020/050131 on Feb. 17, 2020, now abandoned.

(30) Foreign Application Priority Data

Feb. 18, 2019    (AU) ................................. 2019900518

(51) Int. Cl.
G09B 9/00 (2006.01)
G09B 9/30 (2006.01)
(52) U.S. Cl.
CPC ............. G09B 9/006 (2013.01); G09B 9/003 (2013.01); G09B 9/307 (2013.01)
(58) Field of Classification Search
CPC ......... G09B 9/006; G09B 9/003; G09B 9/307
See application file for complete search history.

(56) References Cited

U.S. PATENT DOCUMENTS

| | | | |
|---|---|---|---|
| 2,278,482 | A | 4/1942 | Pishvanov |
| 4,057,913 | A | 11/1977 | Eisenberg |
| 5,310,135 | A | 5/1994 | Fowler et al. |
| 6,629,085 | B1 | 9/2003 | Krogmann |
| 7,586,514 | B1 | 9/2009 | Salazar et al. |
| 8,009,229 | B1 | 8/2011 | Peterson |
| 8,616,884 | B1 | 12/2013 | Lechner et al. |
| 10,029,791 | B2 | 7/2018 | Roemerman et al. |
| 10,670,372 | B2 | 6/2020 | VanCamp et al. |
| 11,022,403 | B2 | 6/2021 | VanCamp et al. |
| 2005/0183570 | A1 | 8/2005 | McMahon |

(Continued)

FOREIGN PATENT DOCUMENTS

JP        2010515876 A      5/2010

OTHER PUBLICATIONS

Australia Search Report dated Oct. 31, 2019 from Australia Application No. 2019900518.

(Continued)

*Primary Examiner* — Steve Rowland
(74) *Attorney, Agent, or Firm* — INNOVATION CAPITAL LAW GROUP, LLP; Vic Lin

(57) ABSTRACT

The present invention relates to a training system for training of a forward controller. The training system utilizes a pod housing that can be attached to a hardpoint under an aircraft wing. The pod is configured to receive communications from the forward controller on the ground (or in another aircraft) and communicate wirelessly with an HMD and/or electronic device in the cockpit of the aircraft. This allows cheaper, less expensive aircraft to be used for training purposes.

14 Claims, 15 Drawing Sheets

(56)                    References Cited

U.S. PATENT DOCUMENTS

| | | |
|---|---|---|
| 2006/0219094 A1 | 10/2006 | Padan |
| 2009/0100995 A1 | 4/2009 | Fisher |
| 2012/0150365 A1 | 6/2012 | Maxwell et al. |
| 2013/0002525 A1 | 1/2013 | Foote |
| 2013/0323686 A1 | 12/2013 | Wenger et al. |
| 2014/0131508 A1 | 5/2014 | Roemerman |
| 2014/0230637 A1 | 8/2014 | Roemerman et al. |
| 2015/0059609 A1 | 3/2015 | Tepera et al. |
| 2017/0082397 A1 | 3/2017 | Hester, Jr. et al. |
| 2017/0255257 A1 | 9/2017 | Tiana et al. |
| 2018/0224650 A1 | 8/2018 | Havens et al. |
| 2019/0039733 A1 | 2/2019 | Hayat |

OTHER PUBLICATIONS

International Preliminary Report on Patentability (Chapter II) dated Jun. 15, 2021 from PCT Application No. PCT/AU2020/050131.
International Search Report & Written Opinion dated May 26, 2020 from PCT Application No. PCT/AU2020/050131.

1000

1110a

1100

1130

WEAPON TARGETING TRAINING SYSTEM AND METHOD THEREFOR

FIELD OF THE INVENTION

The present invention relates to a weapon targeting training system and method therefor, and in particular to an aircraft based, Joint Terminal Attack Controller (JTAC) training system and method therefor.

The invention has been developed primarily for use in/with Joint Terminal Attack Controller (JTAC) weapon targeting systems and will be described hereinafter with reference to this application. However, it will be appreciated that the invention is not limited to this particular field of use.

BACKGROUND OF THE INVENTION

At present, when aircraft are used for delivering weapons in a conflict, a common practice has been to use ground- or air-based troops as "forward air controllers" for directing the targeting of the weapons of an aircraft. The United States Armed Forces typically use the term Joint Terminal Attack Controller (JTAC) for at least some of their forward air controllers. Other forces, such as NATO, use the term Forward Air Controller (FAC) for such personnel. This invention relates to the training of such personnel regardless of the term used to describe them.

In order for a forward air controller to direct targeting of an aircraft's weaponry, a targeting system is used, which is directed by a person known as a forward controller, to locate the target and assist in the aiming or even employ the weapons of aircraft such as the F/A-18A/B. The targeting system can include various targeting means, including Electro-Optic (EO) and/or InfraRed (IR) and/or laser targeting equipment, that is picked up as a signal by sensitive electronics on the aircraft, and is used for accurate targeting by the aircraft.

In a conflict, personnel from a wide variety of countries may be employed as a forward controller, and may be directing aircraft from a different country or force. For this reason, any personnel employed as a forward controller need to have standardised training to ensure that weapon deployment is accurate, expensive weaponry is not wasted, and that friendly forces or non-combatants near the strike area are not inadvertently targeted.

However, training of personnel on such targeting systems can be costly, as the running costs of an aircraft such as the F/A-18A/B are very high.

Any discussion of the background art throughout the specification should in no way be considered as an admission that such background art is prior art, nor that such background art is widely known or forms part of the common general knowledge in the field in Australia or any other country.

SUMMARY OF THE INVENTION

The invention seeks to provide a weapon targeting training system and method therefor, which will overcome or substantially ameliorate at least some of the deficiencies of the prior art, or to at least provide an alternative.

According to a first aspect of the present invention, the invention may be said to consist in an aircraft based weapon targeting training system for training a forward controller to aim weaponry that is mounted on an aircraft, the weapon targeting training system including:

a. at least one or more transceivers configured for wireless communication with a surface terminal and a cockpit terminal;

b. a controller configured for:
  (i) receiving a target signal from a surface terminal, the target signal being indicative of a ground target being targeted by the forward controller; and
  (ii) transmitting the target signal wirelessly to a cockpit terminal in the cockpit of the aircraft.

According to a further aspect, the invention may be said to consist in an aircraft based weapon targeting training system for training a forward controller to aim weaponry that is mounted on an aircraft, the weapon targeting training system including:

a. a housing configured for attachment to an aircraft;

b. a power source housed within the housing, the power source being configured for powering the weapon targeting training system;

c. at least one or more transceivers housed within the housing, the at least one or more transceivers being configured for wireless communication with a surface terminal and a cockpit terminal and a helmet mounted display;

d. at least one or more sensors housed within the housing, the sensors being configured for detecting one or more selected from:
  i) a location of the aircraft;
  ii) an orientation of the aircraft;
  iii) a velocity of the aircraft;
  iv) an acceleration of the aircraft;
  v) an image from a target on the ground;
  vi) an air speed of the aircraft;
  vii) an altitude of the aircraft;

e. a controller housed within the housing, the controller being configured for:
  i) storing digital terrain data;
  ii) receiving a target signal from a surface terminal, the target signal being indicative of a ground target being targeted by the forward controller;
  iii) transmitting the target signal wirelessly to the cockpit terminal in the cockpit of the aircraft; and
  iv) receiving from the at least one or more sensors a positioning signal indicative of the location of the aircraft; and, optionally, one or more selected from;
    (i) an altitude signal indicative of the altitude of the aircraft;
    (ii) an airspeed signal indicative of the airspeed of the aircraft;
    (iii) an orientation signal indicative of the orientation of the aircraft;
    (iv) a velocity signal indicative of the velocity of the aircraft;
    (v) an acceleration signal indicative of the acceleration of the aircraft;
  v) calculating the velocity of the aircraft from the positioning signal; and
  vi) calculating a weapon trajectory for a dummy weapon based on one or more selected from:
    (i) the positioning signal;
    (ii) the airspeed signal;
    (iii) the aircraft velocity; and
    (iv) the altitude of the signal;
  vii) calculating one or more selected from a continuously calculated impact point (CCIP) and a continuously calculated release point (CCRP) from the weapon trajectory and digital terrain data;

viii) determining a CCIP display signal from the CCIP or a CCRP display signal from the CCRP and transmitting the respective one of the CCIP display signal or CCRP display signal wirelessly to the cockpit terminal (5000) or a helmet mounted display;

ix) receiving a pickle signal from a user actuating a pickle button in response to the respective one of the CCIP display signal or CCRP display signal received at the respective one of the cockpit terminal or helmet mounted display; and x) actuating the release of a dummy weapon on receipt of the pickle signal.

In one embodiment, the housing is configured for removable attachment to an aircraft.

In one embodiment, the training system includes:

a. a first wireless transceiver configured for communicating with a surface terminal; and b. a second wireless transceiver configured for communicating with a cockpit terminal.

In one embodiment, the sensor for detecting an image from a target on the ground is controllable by the controller to focus on a sensed target on the ground.

In one embodiment, the digital terrain data is three-dimensional terrain data.

In one embodiment, the controller is configured for:

a. receiving a control signal from the cockpit terminal; and b. controlling movement of the sensor to focus on a ground target identified by the target signal.

In one embodiment, the controller is configured for:

a. receiving a sensor signal from the sensor focused on the ground target; and b. transmitting the sensor signal to the surface terminal.

In one embodiment, the controller is configured for:

a. transmitting the sensor signal to the cockpit terminal.

In one embodiment, the controller is configured for receiving a confirmation signal from the surface terminal.

In one embodiment, the controller is configured for transmitting the confirmation signal to the cockpit terminal.

In one embodiment, the target signal includes an indication of a target location and the controller is configured for:

a. determining a target signal from the target location; and b. wirelessly transmitting the target signal to the cockpit terminal in the aircraft.

In one embodiment, the weapon targeting training system includes a rack to which a dummy weapon is releasably attachable.

In one embodiment, the rack is mounted to the housing.

According to a first aspect of the present invention, the invention may be said to consist in a method of training a forward controller to aim weaponry mounted on an aircraft at a target, the method including the steps of:

a. providing a training system as claimed in claim 1;

b. receiving a target signal from a surface terminal;

c. determining a target location on a digital terrain data based on the target signal;

d. receiving from at least one or more sensors one or more selected from:

i) a positioning signal indicative of the location of the aircraft;

ii) an altitude signal indicative of the altitude of the aircraft;

iii) an airspeed signal indicative of the airspeed of the aircraft;

iv) an orientation signal indicative of the orientation of the aircraft;

v) a velocity signal indicative of the velocity of the aircraft;

vi) an acceleration signal indicative of the acceleration of the aircraft e. calculating a weapon trajectory for a dummy weapon based on one or more selected from:

i) the positioning signal;

ii) the airspeed signal;

iii) the aircraft velocity; and iv) the altitude signal;

f. calculating a target solution for a dummy weapon mounted on the aircraft based on the calculated weapon trajectory and the digital terrain data; and wherein the targeting solution is one or more selected from a continuously calculated impact point (CCIP) and a continuously calculated release point (CCRP).

Other aspects of the invention are also disclosed.

BRIEF DESCRIPTION OF THE DRAWINGS

Notwithstanding any other forms which may fall within the scope of the present invention, a preferred embodiment of the invention will now be described, by way of example only, with reference to the accompanying drawings in which.

DESCRIPTION OF EMBODIMENTS

Figure 1:
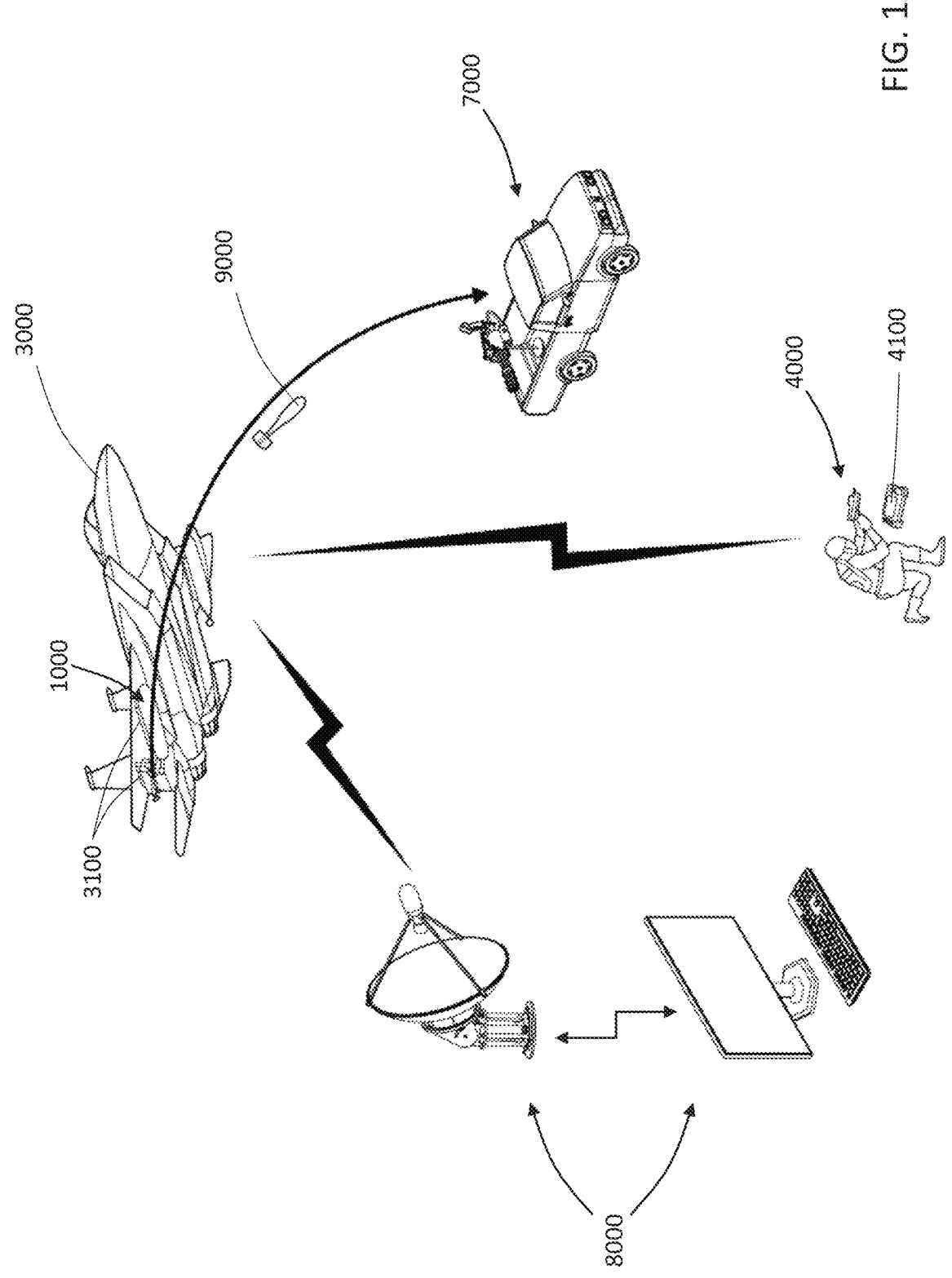
FIG. 1 shows a communications network between a training system on an aircraft interacting with a ground-based monitoring station and a surface terminal computing to target a ground target using a dummy weapon.

It should be noted in the following description that like or the same reference numerals in different embodiments denote the same or similar features.

Pod Based Training System

Figure 2:
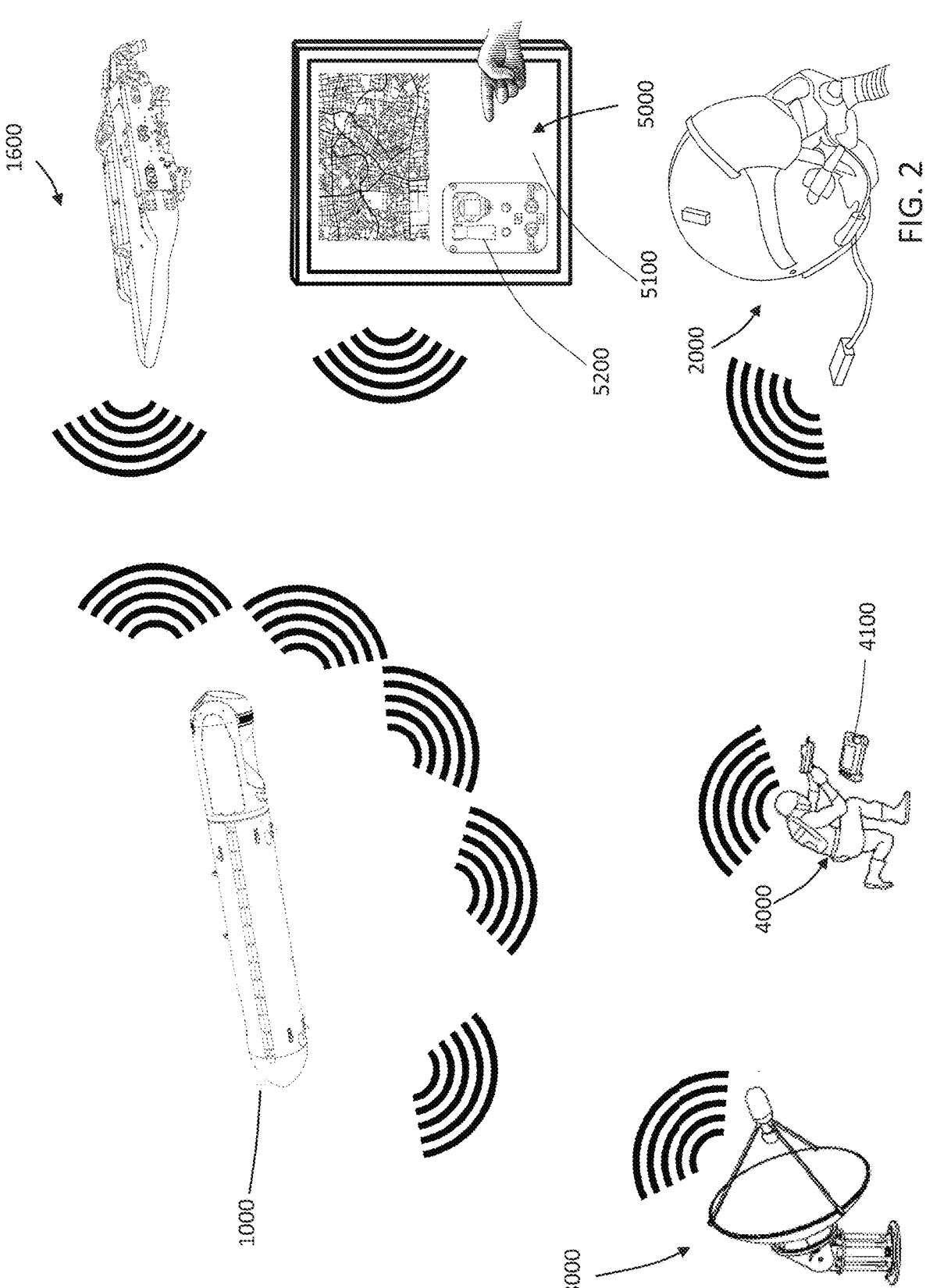
FIG. 2 shows a communications network between a training system, a cockpit terminal, a HMD arrangement, a surface terminal and a ground-based monitoring station.

In a first aspect, there is provided a weapons targeting training system 1000 (the "training system") as shown in FIGS. 1 and 2. The weapons targeting training system 1000 is for training a ground-based or air-based forward controller 4000 to aim weaponry mounted on an aircraft 3000 at a target 7000. The target 7000 is preferably a surface target, such as a ground target or a water target, although air targets are also envisaged. The ground-based forward controller 4000 typically has access to a surface terminal 4100 that is able to communicate wirelessly with the training system 1000. The surface terminal 4100 is the same as the surface terminal used in actual combat situations, and typically includes a forward controller device 4110, that includes a display screen (not shown) and an input arrangement (not shown) whereby the forward controller is able to input information. The surface terminal 4100 further includes a transceiver 4120 configured for wireless communication with the training system 1000.

Figure 5:
FIG. 5 shows a perspective view of a first embodiment of a training system in a pod style housing.
Figure 6:
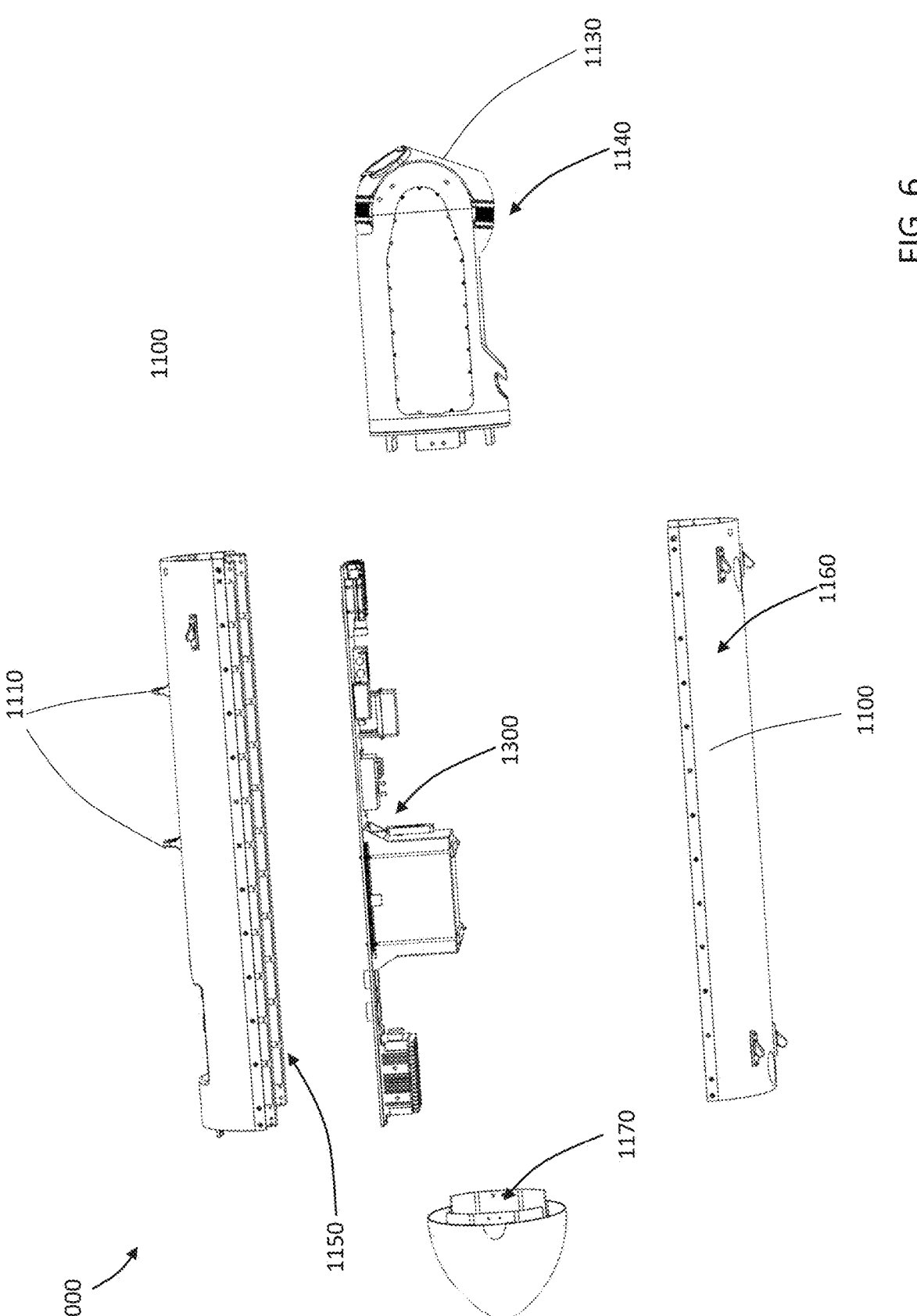
FIG. 6 shows an exploded perspective view of the training system of FIG. 5.
Figure 7:
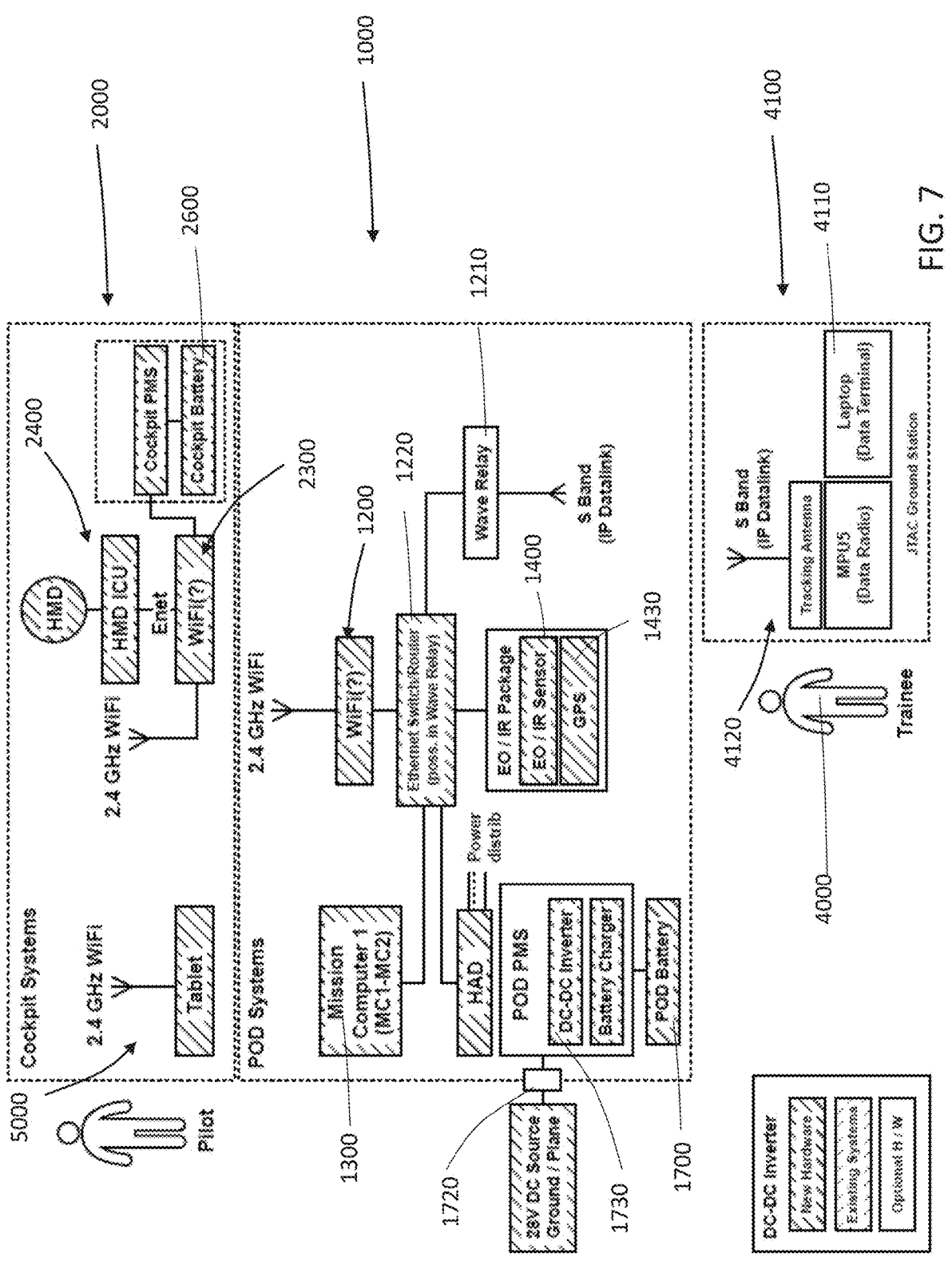
FIG. 7 shows a schematic view of a training system according to the invention, a cockpit terminal, a HMD and a surface terminal, showing the electronic componentry.

The weapons targeting training system 1000 is preferably removably mountable to an aircraft 3000 in a pod type housing 1100, as shown in FIGS. 5 and 6. The housing 1100 is mountable to a hard point 3100 typically under the aircraft's wing or on the aircraft's centreline, and preferably to a military pylon (not shown) if this is available on the aircraft that the housing 1100 is being mounted to, in order to facilitate the convenient removability of the housing 1100 from the aircraft 3000. To this extent, the housing 1100 includes connecting formations 1110 configured for mounting the housing 1100 to the hard point 3100. Such connecting formations 1110 preferably coincide in shape and configuration with connecting formations currently known in the art for connecting other items to such hard points 3100, although a wide variety of types and configurations of connecting formations are envisaged as being possible.

Figure 10:
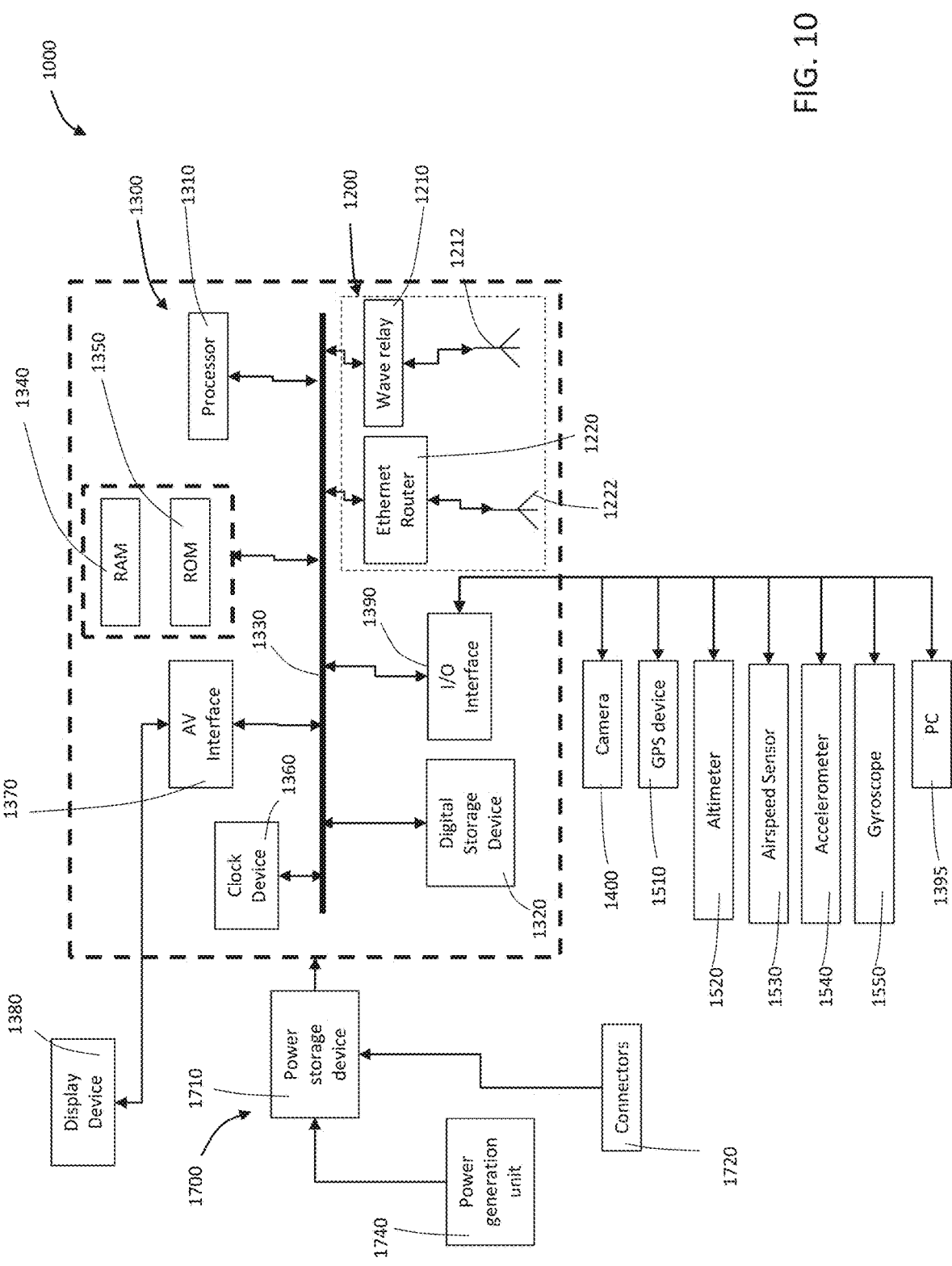
FIG. 10 shows a schematic view of the components of a training system.

As shown in FIG. 10, the training system 1000 includes a wireless transceiver in the form of one or more wireless network interfaces 1200 that is configured for transmitting signals to and receiving signals from the surface terminal 4100, and preferably a ground-based monitoring station 8000. The wireless network interface 1200 is also configured for transmitting signals to and receiving signals from a cockpit terminal 5000, preferably in the form of a tablet style mobile computing device (shown in FIG. 11).

Further, the wireless network interface 1200 of the training system 1000 is also configured for wirelessly receiving signals from and transmitting signals to a helmet mounted display (HMD) arrangement 2000 as will be described in more detail below.

The communications protocol for wireless communication between the ground-based monitoring station 8000 and the pod 1100 will preferably utilise a wave relay 1210 using an S-Band or L-Band Datalink protocol, and a suitable antenna 1212.

The communications protocol for wireless communication between the surface terminal 4100 and the training system 1000 will preferably utilise encrypted VHF/UHF voice and data communications, L-Band analog video, and a suitable antenna.

This is the same as that used for combat communications, as the actual combat ready surface terminal 4100 that is typically used to train the forward controller 4000. The system is preferably readily adaptable to be compliant with evolving ground terminals 4100 technology such as Link-16, SATCOM and IP/wideband networks.

The wireless network interface 1200 used for shorter range communications between the training system 1000 and the cockpit terminal 5000 and/or weapons rack 1600 as will be described below and/or HMD arrangement 2000, is preferably in the form of a 2.4 GHz and/or 5 GHz Wi-Fi enabled communications Ethernet router 1220 (or similar communication chip) and associated antenna 1222 as are known in mobile computing devices, utilising one of the IEEE 802.11 wireless protocols, preferably in encrypted format. It is envisaged that alternative forms of wireless transceivers utilising a wide variety of communications protocols and frequencies are possible.

In addition, the wireless network interface 1200 will be configured for communicating with a ground-based or aircraft-based monitoring station 8000 at a weapons training facility (not shown) where the forward controller 4000 is being trained. A longer range communications transceiver and protocol is envisaged for communications with a monitoring station 8000, especially if it is ground based.

It is envisaged that in an alternative embodiment (not shown), separate wireless transceivers could be provided for communication with any combination of the surface terminal 4100, cockpit terminal 5000, monitoring station 8000 or helmet mounted display arrangement 2000.

In order to communicate with the surface terminal 4100, it is envisaged that the wireless network interface 1200 can preferably be configured for operation using a standard military variable message format (VMF) and voice communications link (HF/VHF/UHF's) and an analog video L-Band link. Alternatively the wireless network interface 1200 will be configured for operation using the S-band or L-Band IP-based datalink protocol that carries H264 encoded video and VMF data to be used by the surface terminal 4100.

As shown in FIG. 10, the training system further includes a controller 1300 in the form of a mission computer housed within the housing 1100. It is envisaged that the controller 1300 will include a processor 1310 as well as a communications bus 1330, random access memory (RAM) 1340, read-only memory (ROM) 1350 and a clock device 1360 for determining time or time lapse. The training system 1000 further includes digital storage media 1320 on which data and/or software instructions are storable. The digital storage media 1320 is preferably also configured to store digital terrain data, including two-dimensional elevation data. The digital storage media 1320 is preferably in the form of solid state device (SSD) memory, with an operating system loaded on it such as Windows™, Linux™, OS™ or Android™, although alternative and/or bespoke operating systems are also envisaged. SSD memory is expected to be less susceptible to being affected by g-forces acting on the aircraft and training system 1000.

As mentioned, the digital storage media 1320 is configured for storage of data, for example in a database, and software instructions (not shown). The software instructions are preferably configured for directing the controller to carry out the steps and methods as detailed below. It is envisaged that the training system 1000 can include an audiovisual interface 1370 for connection to a display, either through a connector (not shown) or the training system 1000 can include a display 1380.

The training system further includes one or more Input/Output (I/O) interface 1390 for interfacing with internal devices such as a camera 1400, a satellite-based geo-positioning system 1510, an airspeed sensor 1530, one or more accelerometers 1540 and one or more gyroscopes 1550, and/or interfacing with external devices such as a computing device 1395.

The controller 1300 preferably includes semiconductor memory (not shown) comprising volatile memory such as random-access memory (RAM) or read only memory (ROM). The memory may comprise either RAM or ROM or a combination of RAM and ROM.

The digital storage media 1320, or any other digital storage media referred to in this specification can be optical media such as CD-ROM disks, and/or magnetic media such as hard drives, but is preferably provided in the form of one or more flash media or solid-state drives (SSD), which are expected to be less subject to interference by acceleration forces during flight.

The training system 1000 preferably includes an I/O interface (not shown) for communicating with one or more peripheral devices. The I/O interface may also communicate with one or more human input devices (HID) (not shown) such as keyboards, pointing devices, joysticks and the like. These could be used, for example, for trainers to connect to the training system 1000 when the aircraft is on the ground, to download saved data, training logs, test the training system for errors or the like.

The I/O interface can also include a computer to computer interface, such as a Recommended Standard 232 (RS-232) interface, for interfacing the training system 1000 with one or more personal computing (PC) devices or mobile computing devices such as tablets, laptops or the like.

Processors referred to in this specification generally can include an arithmetic logic unit, instructions control unit (ICU) and/or processor configured for performing the software or computer program code instructions. The software can be embedded on a purpose built digital storage media or can be non-embedded or reconfigurable.

The processor 1310 may be a reduced instruction set computer (RISC) or complex instruction set computer (CISC) processor or the like.

The training system 1000 further includes a sensor in the form of an electro-optical and infrared (EO/IR) sensor (hereinafter the "camera") 1400. The camera 1400 is preferably able to focus on objects on the ground that give off light and/or heat signatures, and especially on the infrared light from an infrared laser that is being pointed at a target 7000 from the forward controller 4000. The camera 1400 is preferably able to provide H.264 and analogue video streams and will have a GPS subsystem 1430 and an ethernet based control interface (not shown) associated with it.

Figure 8:
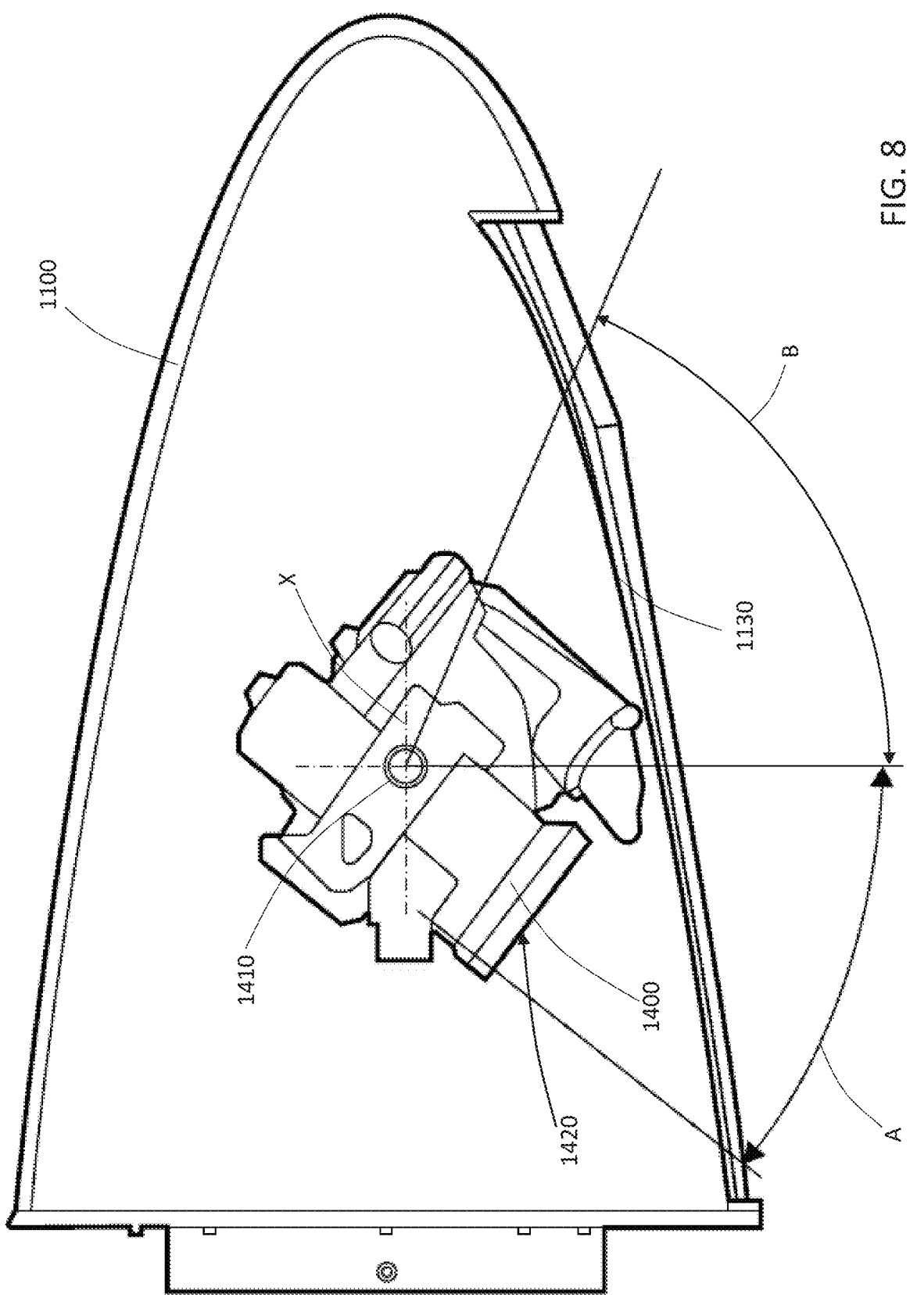
FIG. 8 shows a cutaway view of a nose cone of a pod style housing, showing the camera set on a movable axis.

The camera 1400 is preferably mounted on one or more gimbals 1410 powered by electric motors (not shown) that allow the direction and orientation of the camera to be controlled to rotate around at least one axis (shown as reference X in FIG. 8), and preferably two axes. The camera 1400 is preferably movable in a forward/backward direction in a range of between −37° (shown as arrow A in FIG. 8) and +54° (shown as arrow B in FIG. 8) from vertically downwards. In alternative embodiments, it is envisaged that the range of movement could vary anywhere between −90 and +90, and the camera 1400 could also move from side to side, or in any direction.

Preferably, the camera 1400 is also controllable by the controller 1300 to be able to focus on ground targets 7000 at a distance, and has one or more suitable lenses 1420 for this purpose, which are also controllable by the controller 1300 as described in more detail below.

The camera 1400 is preferably housed within the housing 1100. It is envisaged that the housing 1100 will include a window 1130 or viewing port through which the camera 1400 is able to view the ground.

In a preferred embodiment, the camera 1400 will be an EO950 electro optic sensor, including the features of:

a. electro optic imaging performance;

b. command and control interface;

c. digital video output interface; and d. location and attitude sense and interface (ATTNAV).

In an alternative embodiment, the sensor 1400 will be an Alticam™ 14 EO/IR/Laser sensor. It will be appreciated by a person skilled in the art that a wide variety of alternative sensors could be used.

In an alternative embodiment, it is envisaged that alternative and/or additional radio frequency sensors may be provided, such as sound or ultrasound sensors, microwave sensors, or the like.

It is further envisaged that the training system 1000 can include a power source 1700, preferably in the form of a battery 1710, or may be configured with electrical connectors for connection to an electrical power source on the aircraft. Where a battery 1700 is provided, it is envisaged that the battery will be rechargeable via a suitable electrical connector 1720 in the housing 1100. The training system could also include an inverter 1730 for converting Dc power from the battery 1710 to AC power.

In an alternative embodiment (not shown) it is envisaged that the training system 1000 can include a power generator (not shown). The power generator could be driven by airflow over the housing. Alternatively, it is envisaged that the power generator could include a solar cell is configured for charging a battery 1710. Examples of such a power generator include air driven turbines, propellers, or the like. It is envisaged that known circuitry would be provided to prevent overcharging of the battery, and the provision of current to the battery in the requisite format.

The training system 1000 further includes a variety of additional sensors 1500 that are required to carry out its functions. In particular, the training system includes satellite-based geo-positioning system 1510, for determining the position of the training system 1000 from signals received from geo-positioning satellites. The geo-positioning system 1500 is configured for transmitting a position signal to the controller 1300. The controller 1300 is preferably also configured for determining the ground speed or velocity of the training system from the change in position over time. Alternatively, the controller 1300 could receive a velocity signal from the geo-positioning system 1500.

The sensors 1500 preferably also includes an altimeter 1520 configured for transmitting an altitude signal to the controller 1300, and at least one or more airspeed sensors 1530 that is configured for sensing the airspeed of the aircraft 3000. The airspeed sensors 1530 are preferably configured for detecting the airspeed of the aircraft in at least two directions.

Further, the sensors 1500 can include one or more accelerometers 1540 and/or gyroscopes 1550. The use of the sensors 1500 will be described in more detail below. Additionally, voltage, current and temperature sensors may be provided for monitoring temperatures within the housing, as well as battery levels.

In addition to the above, the training system 1000 will preferably include a health and diagnostic subsystem configured for power control, monitoring and diagnostics of the training system 1000.

In order to carry out the functionality as will be described in more detail below, it is envisaged that the software instructions stored on the digital storage media 1320 will be broadly divided into a series of subsystems, including the camera subsystem, health and diagnostic subsystem, power subsystem, cockpit communication subsystem, ground communication subsystem, stores management subsystem and mission computer subsystem.

The camera subsystem will cover control and management of the camera 1400.

The health and diagnostic subsystem will ensure ongoing monitoring and diagnostics of the temperatures, functionality and power levels of the training system 1000.

The cockpit communication subsystem will manage communications between the training system 1000 the cockpit terminal 5000 and the HMD arrangement 2000.

The ground communication subsystem will manage communications between the training system 1000, the surface terminal 4100, and the ground monitoring station 8000.

The stores management subsystem will manage operation and control of the weapon rack 1600.

The mission computer subsystem will manage the rest of the subsystems. The mission computer subsystem will further allow for logging of mission data, and allow for access to the digital terrain data and associated data.

As illustrated in FIG. 6, the pod housing 1100 is preferably designed in modular sections that can preferably be easily and conveniently swapped or replaced, for example by providing a rollout or clipping type engaging arrangement.

This allows the weapons targeting training system 1000 to be readily adapted for different payloads. In the embodiment shown in FIG. 6, the EEO/IR sensor camera 1400 will be provided in a first zone 1140. Avionics equipment including mission computer, communication system, and battery/power system are preferably installed in a second zone 1150. Further, the second zone provides a mechanical connection to the aircraft via connecting formations 1110. Antenna systems may be housed in a third zone 1160. A fourth zone 1170 may be provided in the tail. It is envisaged that any number of zones may be provided. Additional zones may be provided for extra equipment or payloads such as additional computing and/or communication systems.

It is further envisaged that the different zones can be sealed and/or shielded electromagnetically from each other in order to prevent interference in the wireless signals.

Further, it is envisaged that the housing can include a power generation unit 1740 for generating power from local environmental sources in order to supplement the power usage on the battery. Examples of a power generation unit 1740 can include a solar power panel (not shown), and/or a wind turbine (not shown) coupled to a generator that draws energy from airflow over the pod to charge the battery 1710. Such a power generation unit may be housed, for example, in the fourth zone 1170.

Cockpit Terminal

Figure 11:
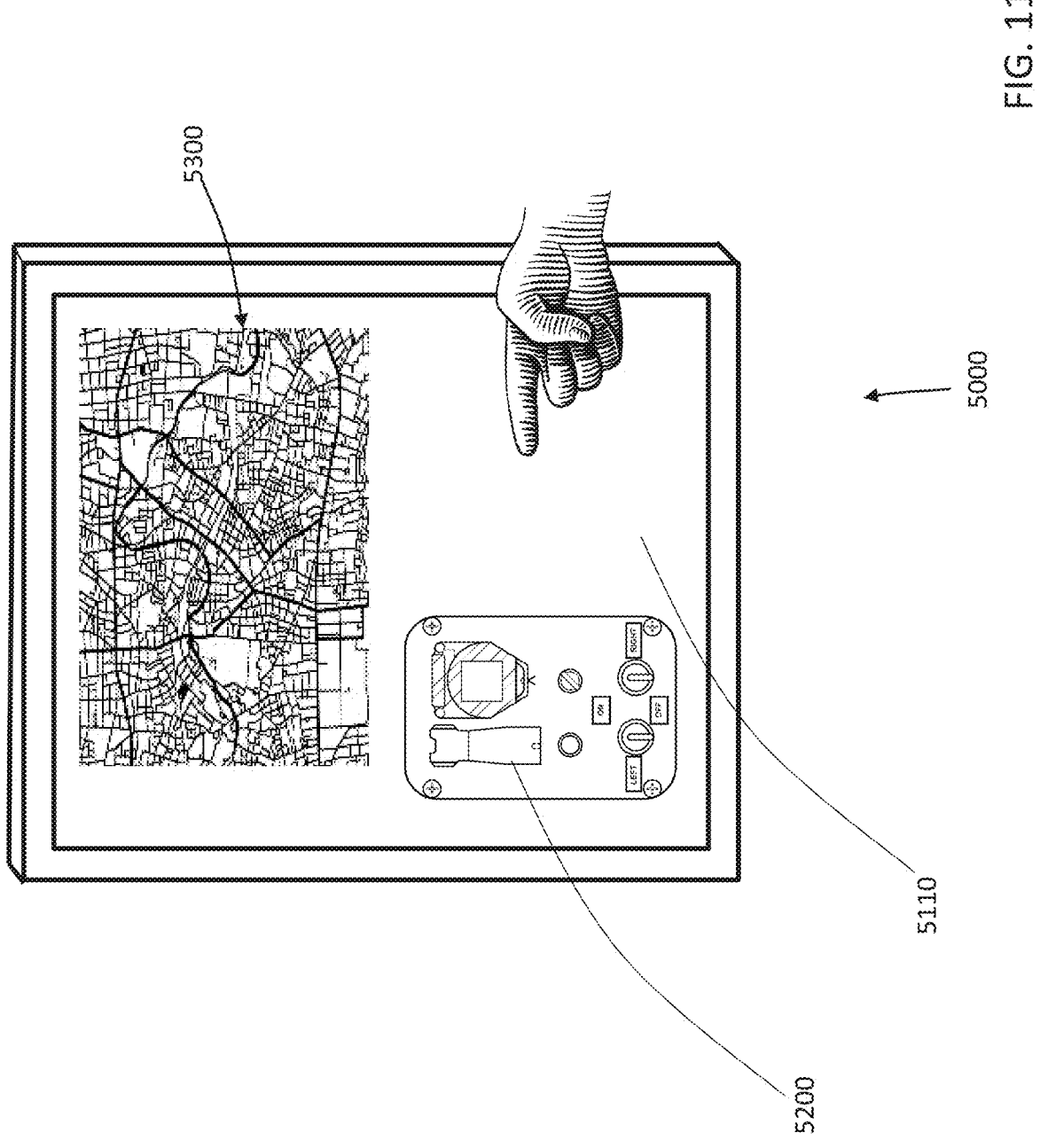
FIG. 11 shows a schematic view of a cockpit terminal showing an electronic map and a pickle button.
Figure 14:
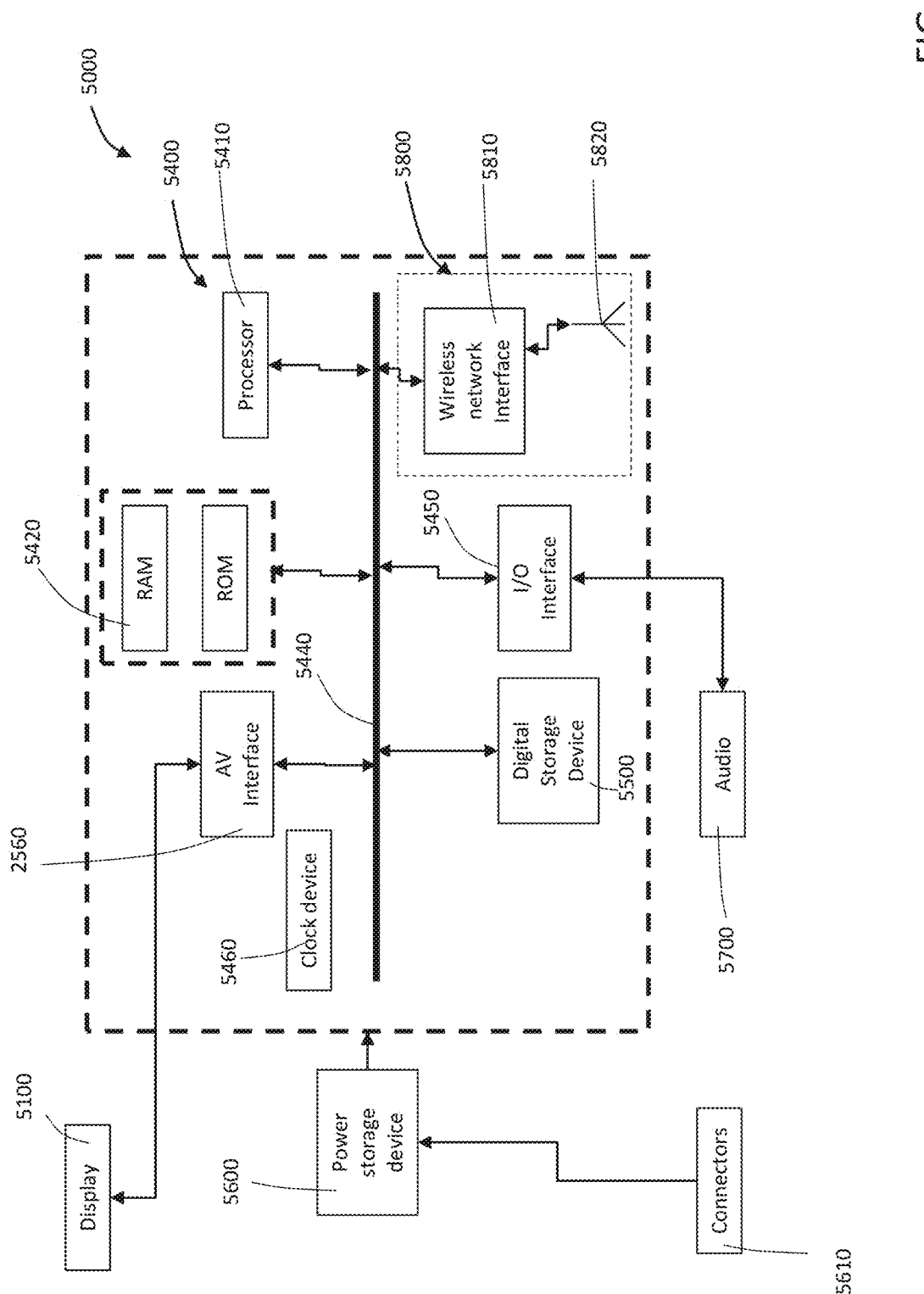
FIG. 14 shows a schematic view of the components of a cockpit terminal.

As shown in FIGS. 11 and 14, the cockpit terminal 5000 is typically in the form of a tablet style mobile computing device, and includes its own transceiver 5800 configured for communicating with the training system 1000 and/or HMD arrangement 2000, and/or weapons rack 1600 preferably in the form of a Wi-Fi enabled wireless network interface 5810 and antenna 5820 as are known in art in mobile computing devices, utilising one of the IEEE 802.11 wireless protocols. It is envisaged that alternative forms of wireless transceivers utilising a wide variety of communications protocols are also possible.

The cockpit terminal 5000 further includes a display 5100, preferably in the form of a touchscreen display 5110 that allows user input; a cockpit terminal controller 5400, and digital storage media 5500 configured for storing instructions and data, preferably in the form of flash memory or solid-state drive SSD memory. The digital storage media preferably includes an operating system, such as Linux™, Windows™ or Android™, loaded on it. A wide variety of user input devices may additionally be provided, such as a mouse, a keyboard, a touchscreen or any other suitable input device.

The cockpit terminal controller 5400 preferably includes a processor 5410, as well as other operating digital storage media such as random-access memory (RAM) 5420, Read Only Memory (ROM), a communications bus and the like. The cockpit terminal controller 5400 also preferably includes a power storage device 5600 such as a removable battery, and electrical connectors 5610 for charging the battery. The cockpit terminal controller 5400 also preferably includes an Input/Output (I/O) interface 5450 for connection to external audio devices 5700, external digital storage media, computing devices, or the like. The cockpit terminal controller 5400 also preferably includes a clock device 5460 for determining time or time lapse. It is to be understood that where steps are described as having been taken by the cockpit terminal 5000 below, the steps will have been carried out by the controller 5400 acting under instruction from software instructions, to control the components described above.

Preferably the digital storage media of the cockpit terminal 5000 is loaded with a three-dimensional digital terrain data, preferably including elevation data, which digital terrain data is also mirrored on the digital storage media 1320 of the training system 1000. The cockpit terminal 5000 will also include software for displaying the digital terrain data as an electronic map.

HMD Arrangement

Figure 9:
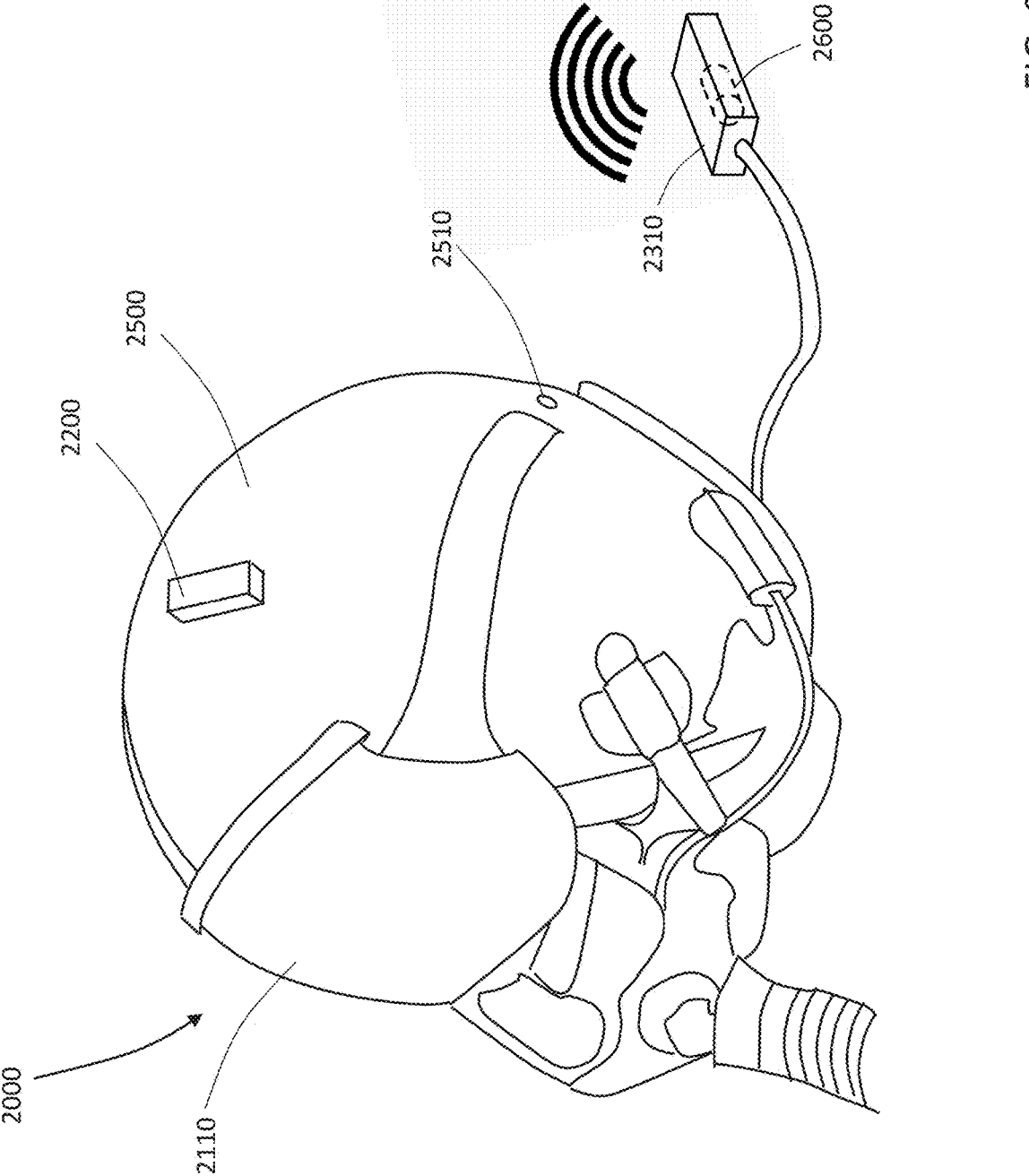
FIG. 9 shows a perspective view of a HMD arrangement.
Figure 13:
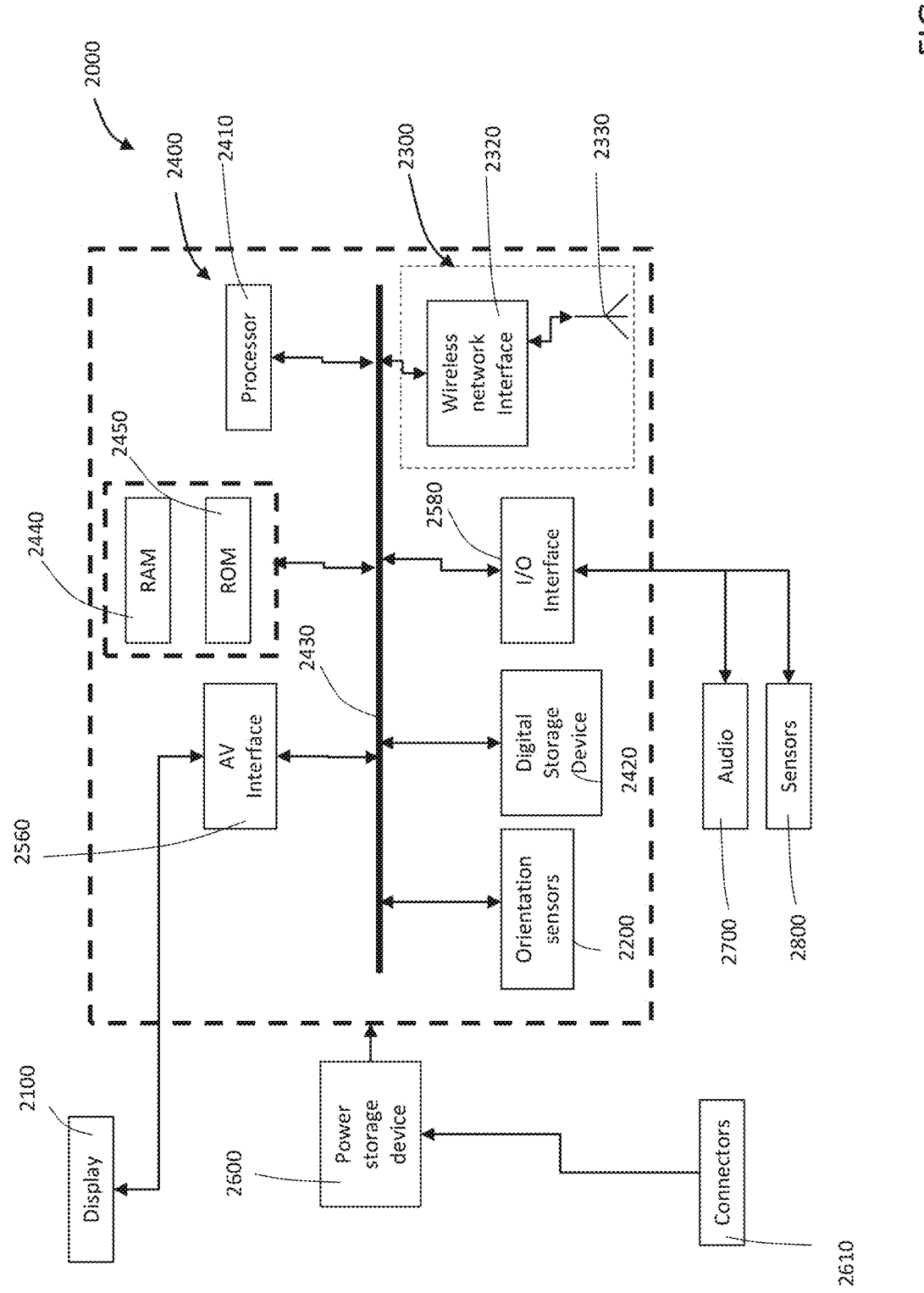
FIG. 13 shows a schematic view of the components of a HMD arrangement.

According to a further aspect, and as shown in FIGS. 9 and 13, there is also provided a helmet mounted display (HMD) arrangement 2000. The HMD arrangement 2000 includes a display 2100, preferably in the form of a visor display device or screen. The display 2100 is configured for displaying a display signal received from the controller 1300 onto a display 2110, preferably as a visor, fitted to a helmet 2500, The display is viewable by a user wearing the helmet, and the HMD arrangement 2000 is configured to adjust the images being displayed in accordance with the orientation of the user's head (and hence the helmet and/or display).

The HMD arrangement 2000 further includes orientation sensors 2200, preferably in the form of at least one or more accelerometers and/or gyroscopes, although other sensors are envisaged. The orientation sensors 2200 are preferably able to sense the direction that the display is facing, as well as the orientation of the HMD arrangement 2000 to the horizontal and/or vertical (and hence the user's head position).

Preferably the HMD arrangement 2000 is configured with attachment points such as snap type clips 2510 or other connectors for mounting to a helmet 2500.

The training system 1000 is configured for communicating wirelessly with the HMD arrangement 2000. To this end, the HMD arrangement 2000 includes a wireless transceiver 2300, preferably in the form of a wireless adapter 2310 that includes a wireless network interface 2320 and associated antenna 2330, that is configured for wireless communication with the training system 1000, preferably using an encrypted WiFi protocol as described above.

As shown in FIG. 13, the HMD arrangement 2000 will preferably also include a controller 2400 that is configured for receiving signals from the orientation sensors 2200 and transmitting these to the training system 1000, as well as receiving display signals from the training system 1000 for display on the visor screen 2100.

The controller 2400 includes a processor 2410 and digital storage media 2420 on which software instructions and/or data can be stored. The digital storage media 2420 may also store digital terrain data, preferably including elevation data. The controller 2400 preferably also includes random access memory (RAM) 2440, read-only memory (ROM) 2450, and an audio-visual interface 2560 or interfacing with the display 2100.

It is further envisaged that the controller can include an input/output (I/O) interface 2580 interfacing with devices such as an audio device 2700 or additional external sensors 2800.

It is envisaged that the HMD arrangement 2000 can include a power source 2600, preferably in the form of a battery, and alternately and/or additionally may be configured with a suitable electrical connector 2610 for being plugged into a power source in the aircraft 3000 for either powering the HMD arrangement 2000, or for charging the battery. The battery is preferably conveniently removable, and can be rechargeable.

Weapon Rack

In one embodiment (not shown) it is envisaged that the training system 1000 can include a weapon rack 1600 mounted to the housing 1100. It is envisaged that the weapon rack 1600 and housing can share the same mounting formations to mount to a hard point 3100 of an aircraft. Preferably, the weapon rack will be configured as a Modular Advanced Light Weight Training System (MALTS) rack.

Alternately, and according to a further aspect of the invention, a separate stores rack or weapon rack 1600 can be provided that has its own connecting formations (not shown) for connecting to a hard point on an aircraft, and preferably to a wing pylon on a military training aircraft. Preferably, where the weapons rack 1600 is self-standing, the connecting formations allow for releasable attachment of the weapon rack 1600 to the aircraft's hard point, preferably by means of a NATO-standard 14-inch interface. Where the weapon rack 1600 is attached to the housing 1100, it is envisaged that the weapon rack 1600 can preferably be permanently attached, for example by welds.

Figure 12:
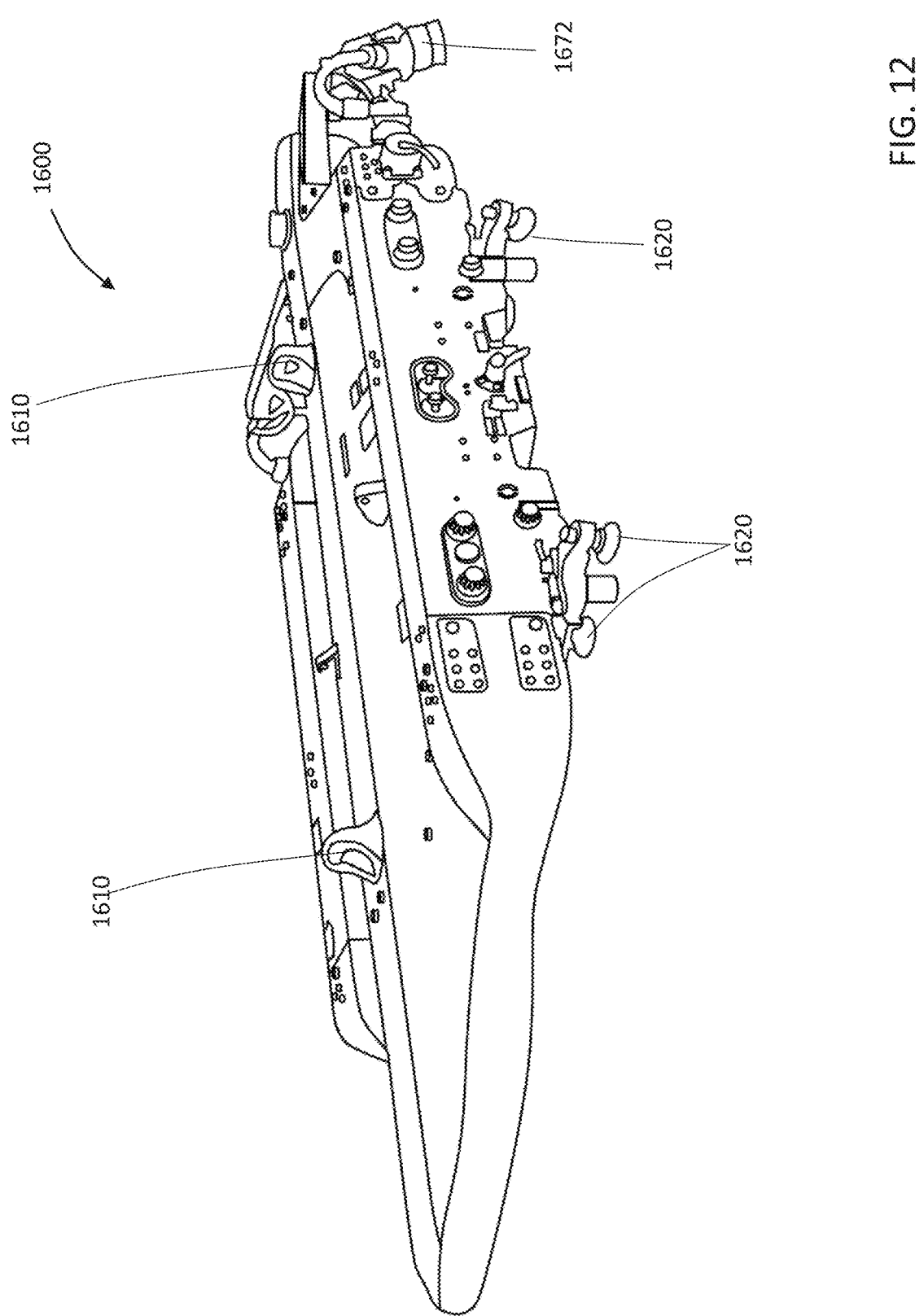
FIG. 12 shows a perspective view of a weapon rack.
Figure 15:
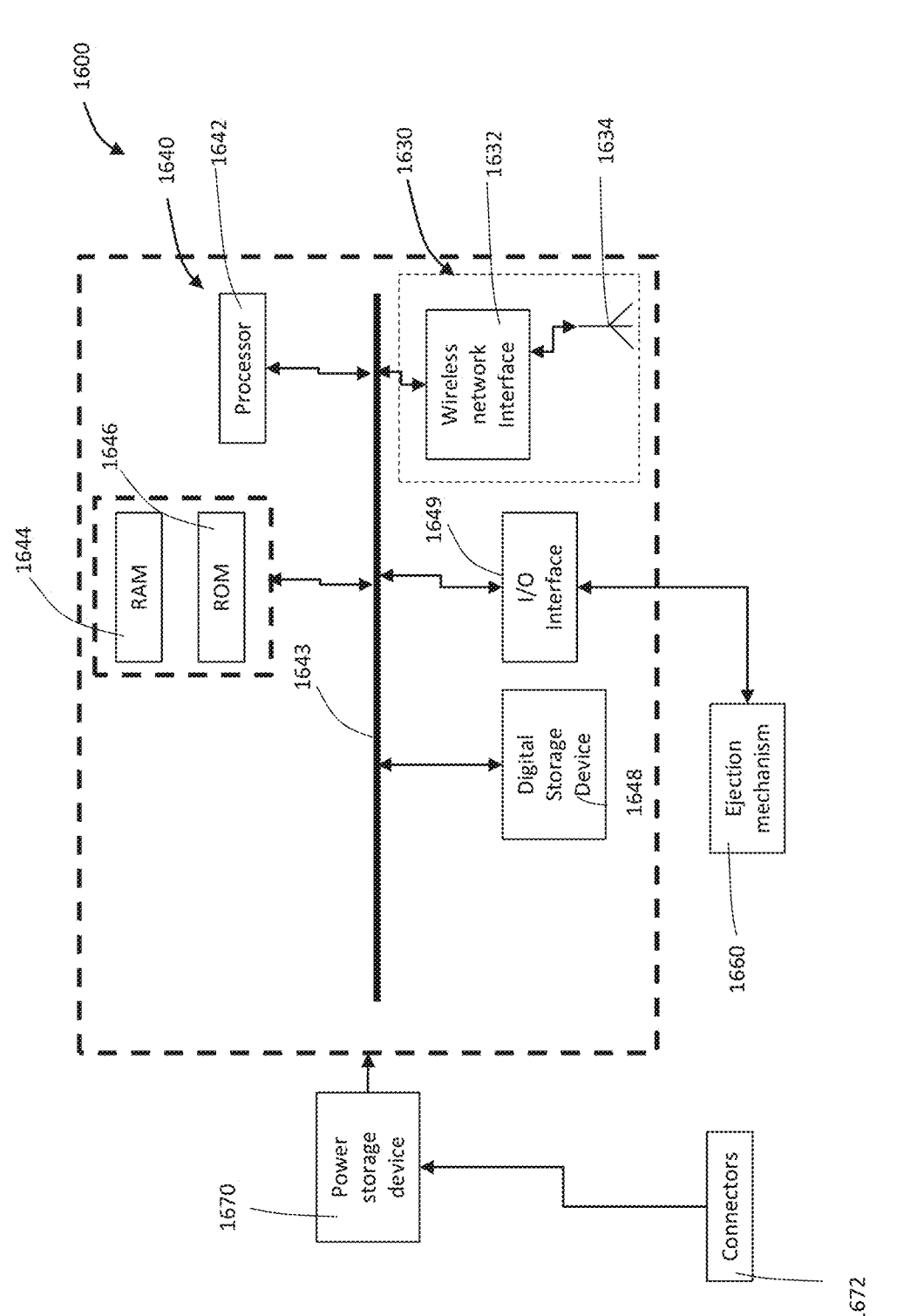
FIG. 15 shows a schematic view of the components of a weapon rack.

As shown in FIGS. 15 and 12, the weapon rack 1600 includes actuatable releasable securing formations 1620 configured for releasably holding a dummy weapon, and for releasing the dummy weapon when the pickle button 5200 is actuated.

The weapon rack 1600 also includes a transceiver 1630, in the form of a wireless network interface 1632 and an associated antenna 1634, configured for transmitting and receiving information from the training system 1000, and a controller 1640 that is configured for receiving an actuation signal from the transceiver 1630 and controlling operation of the actuatable releasable securing formations 1620 to deploy the dummy weapon 9000.

The controller 1640 can include similar features to that of the training system 1000, including a processor 1642, communications bus 1643, random access memory 1644, read-only memory 1646, digital media storage 1648, and an input/output (I/O) interface 1649 for interfacing with the ejection mechanism 1660.

In a preferred embodiment, the releasable securing formations include an ejection mechanism 1660 configured for ejecting the dummy weapon 9000 on deployment, to ensure that the dummy weapon 9000 clears the localised turbulence and air streams around the aircraft 3000.

Most preferably, it is envisaged that the ejection mechanism 1660 can be spring-loaded, in order to achieve cost-effective operating costs, however it is also envisaged that the ejection mechanism 1660 could include an explosive (pyrotechnic) or pneumatic based solution. The spring-loaded ejection mechanism can be actuated by operation of an electrical solenoid, electrical motor, or the like. In an alternative embodiment, it is envisaged that the ejection mechanism 1660 could utilise cylinders of compressed fluid such as compressed air.

In a preferred embodiment, the weapon rack 1600 is configured to be failsafe, whereby in the event of a failure in the actuation of the releasable securing formations, the releasable securing formations will fail to deploy the dummy weapon 9000 and will not inadvertently cause an unexpected deployment of the dummy weapon.

In Use

Figure 3:
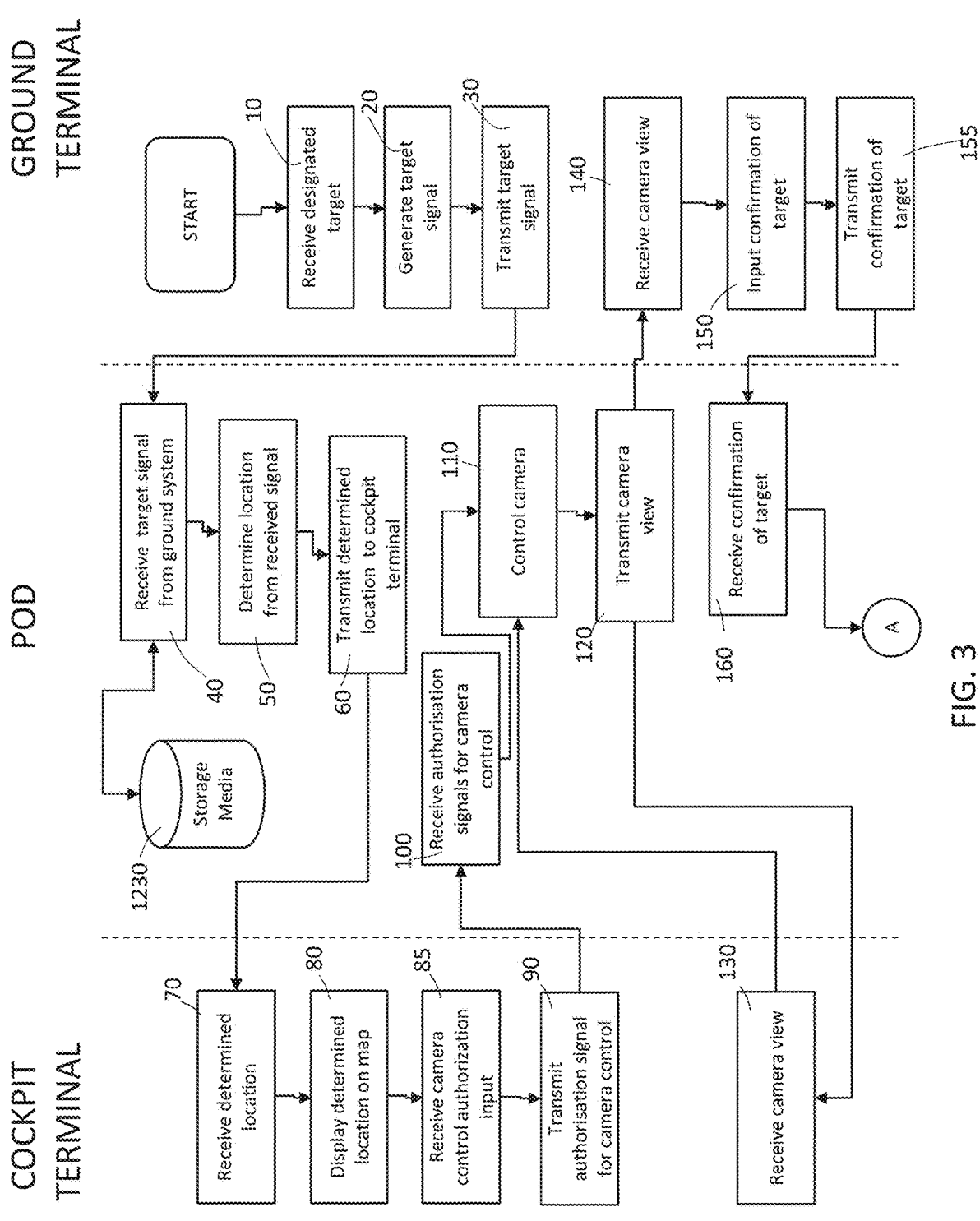
FIG. 3 shows a swim lane type flow chart of a first portion of a method of targeting a ground target for facilitating the training of a forward controller.
Figure 4:
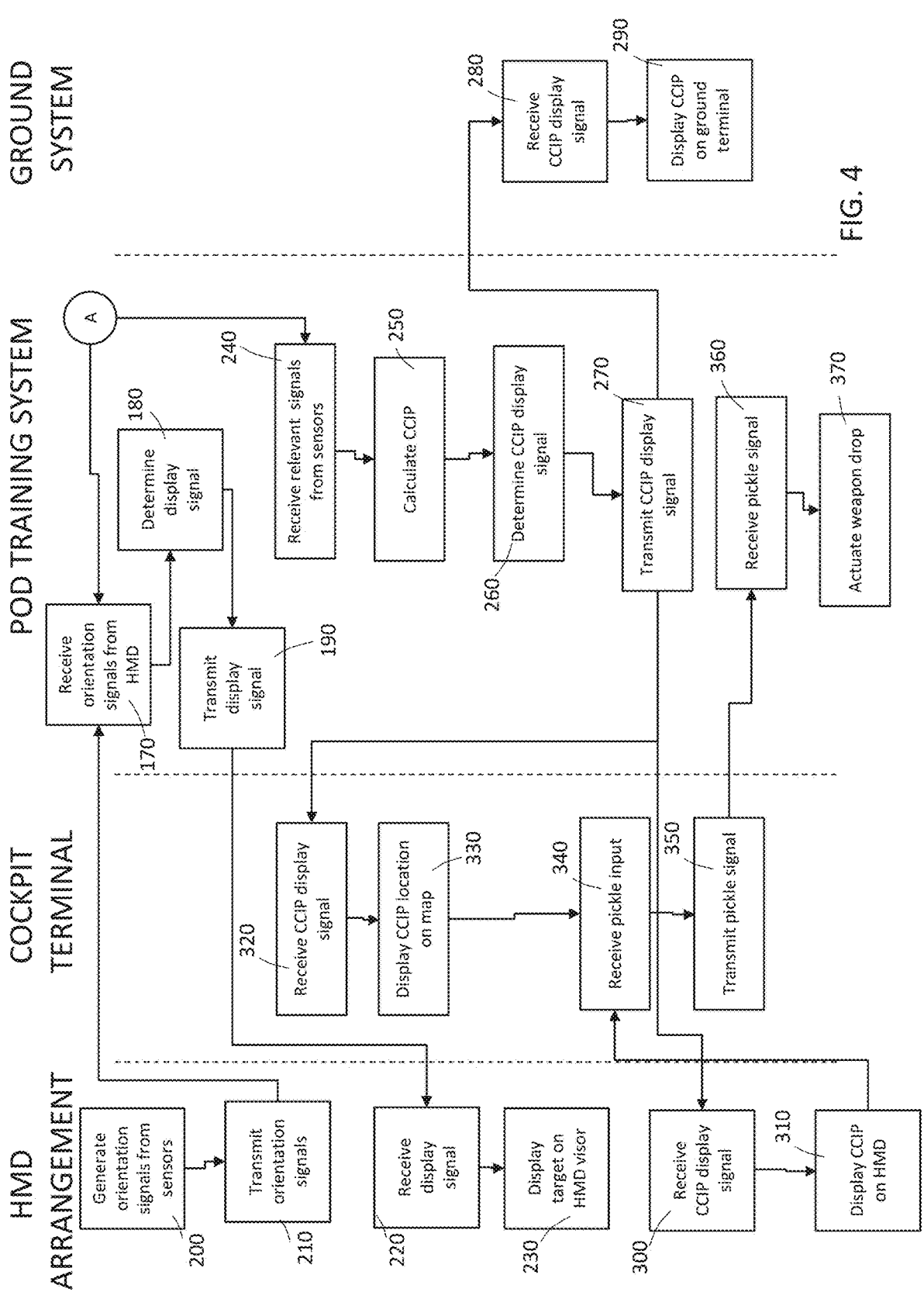
FIG. 4 shows a swim lane type flow chart of a second portion of a method of targeting a ground target for facilitating the training of a forward controller.

Use of the training system 1000 is described below with reference to FIGS. 3 and 4. In use, it is envisaged that the training of a forward controller 4000 will proceed as set out below. Initially, the forward controller 4000 will designate a target 7000, typically located on a ground surface or water surface, which input is received 10 by the surface terminal 4100. The target 7000 can be designated by inputting coordinates on the surface terminal 4100, preferably in the form of latitude, longitude and altitude coordinates. Alternately, the target can be designated by directing a suitable pointing device, such as an infrared laser or light, at the target 7000. Details of this designation will then be generated 20 as a target signal and the target signal will then be transmitted from the surface terminal 4100 to the training system 1000. From this designation, a target signal will be generated 20. The target signal will then be transmitted 30 from the surface terminal to the training system 1000 on the aircraft 3000.

Once the target signal is received 40 by the wireless network interface 1200, the target signal will be stored on the storage media 1230. The target signal will be used to determine 50 the location of the target on the digital terrain data. The determined location will then be transmitted 60 to the cockpit terminal 5000. When the determined location is received 70 by the cockpit terminal 5000, the determined location will be displayed 80 on the touchscreen display 5100 as an electronic map 5300 for a user, such as the pilot or co-pilot to view. The user can then input 85 an authorisation input for control of the camera on the cockpit terminal 5000. An authorisation signal is then transmitted 90 from the cockpit terminal to the wireless network interface 1200 in the pod housing 1100. On receiving 100 the authorisation signal, the controller 1300 will preferably automatically control operation of the camera 1400 to focus in on the target. It is envisaged that the controller 1300 can use the aircraft current location determined from the geo-positioning system 1510, as well as any of the other signals from the sensors 1500 to control 110 the camera 1400 to focus on the target 7000.

Alternatively, it is envisaged that the controller 1300 can transmit the image received by the camera 1400 as a camera view to the cockpit terminal 5000, which will receive 130 the camera view and display it on the screen display 5100 of the cockpit terminal. The cockpit terminal is preferably configured for receiving camera control input from the user in the cockpit for manual control of the camera and transmits it to the training system 1000, after which the controller 1300 will control the camera 1400 in accordance with the received camera control input.

Once the target 7000 has been clearly sighted by the camera 1400, the camera view will be transmitted 120 to the surface terminal 4100. When the camera view is received 140 by the surface terminal 4100, The camera view will preferably be displayed on the display screen 4110 of the surface terminal 4100. The forward controller 4000 will then input 150 a confirmation of the target 7000. The confirmation will then be transmitted 155 to the training system 1000.

It is envisaged that the orientation sensors 2200 of the HMD arrangement 2000 will be generating 200 continuous orientation signals, which will be transmitted 210 by the transceiver 2300, preferably in the form of a wireless network interface 2310 on the HMD arrangement 2000 to the training system 1000. On receiving 170 the orientation signals from the HMD arrangement 2000, the controller 1300 will determine 180 a HMD target display signal using the confirmed target and the orientation signals.

The HMD target display signal will then be transmitted 190 to the HMD arrangement 2000. The HMD arrangement 2000 will receive 220 the HMD target display signal and will display 230 the target on the HMD display 2100 as a HMD target image.

It is envisaged that the controller 1300 will take into account many factors in determining 180 the HMD target display signal, as well as signals from a wide variety of sensors. For example, the controller 1300 will take into account the digital terrain data, including elevation data, in calculating 180 the display signal, to adjust for the altitude of the target on the HMD display 2100. In addition, the controller 1300 will need to take into account the pitch and yaw of the aircraft, the orientation of the HMD arrangement, the altitude of the aircraft, the location of the aircraft, the location of the target, the forces acting on the aircraft and HMD arrangement, et cetera.

Further, the controller 1300 of the training system 1000 will receive 240 relevant signals from a wide variety of sensors 1500, including the geo-positioning system 1510, accelerometers 1540, gyroscope 1550 and altimeter 1520.

The controller will then calculate 250 a targeting solution, preferably in the form of a continuously calculated impact point (CCIP). The calculation 250 of a CCIP is expected to factor in the direction, velocity, altitude, pitch, yaw and air speed of the aircraft in one or more directions, as well as the air density, drag coefficient of the dummy weapon, descent/ascent angle of the aircraft, climb/descend rate, and planform area of the dummy weapon, in order to calculate a trajectory of the dummy weapon 9000 if it were to be released at that time. It is envisaged that the details of the aerodynamic profile of the dummy weapon will also be stored on the digital storage media 1320. The calculation of trajectories is well known in the art, and a fuller discussion on the calculation of the trajectory is deemed to be beyond the scope of the specification. The trajectory is then correlated with the digital terrain data to establish where the calculated trajectory intercepts the terrain to determine the CCIP.

A CCIP is a point in space that indicates the location of an impact point that the dummy weapon would impact if it were to be dropped at that point in time.

It is envisaged that alternatively a continuously calculated release point (CCRP) could be calculated. A CCRP is a point in space that indicates where the dummy weapon would have to be released in order to impact the designated target.

In an alternative embodiment, it is envisaged that an alternative targeting solution, such as a continuously calculated release point (CCRP) could be calculated, however this is not preferred as it can be more easily affected by smaller changes in the positioning of the aircraft. While further explanation of the operation of the training system 1000 is described below with reference to a CCIP, it will be appreciated by those skilled in the art that the operation could apply equally to alternative targeting solutions, including CCRP, or any other suitable targeting solutions.

The CCIP is preferably displayed in real time as a CCIP image as will be described in more detail below.

The controller 1300 will then determine 260 a HMD CCIP display signal, using orientation signals being continuously received from the HMD arrangement 2000. Once the HMD CCIP display signal has been determined 260, it will be transmitted 270 to the HMD arrangement 2000. On receiving 300 the HMD CCIP display signal, the HMD controller 2400 will cause the HMD CCIP display signal to be displayed 310 on the display 2100 as a HMD CCIP image, preferably together with the HMD target image.

It is envisaged that in addition to transmitting 270 the CCIP display signal to the HMD arrangement 2000, the training system 1000 will also transmit a CCIP display signal to the cockpit terminal 5000. Upon receiving 320 the CCIP display signal, the cockpit terminal 5000 will display 330 on the display 5100 the CCIP display signal as a CCIP image. However, it is envisaged that the CCIP display signal that is transmitted to the cockpit terminal 5000 will not factor in orientation signals received from the HMD arrangement 2000. The target will already be displayed on the cockpit terminal from the earlier process as a target image.

It is also envisaged that in addition to transmitting 270 the CCIP display signal to the HMD arrangement 2000, the training system 1000 will also transmit CCIP display signal to the surface terminal 4100. Upon receiving 280 the CCIP display signal, the surface terminal 4100 will display 290 the CCIP image.

The target image and CCIP image will preferably be displayed on both the display 5100 of the cockpit terminal 5000 as well as the display 2100 of the HMD arrangement 2000. Preferably, a terrain map indicative of the digital terrain data, or at least important features of it, are also displayed on both the HMD display 2100 and the display 5100.

In addition to the target and the CCIP, it is envisaged that the HMD arrangement 2000 will also display images designating the following features on the display 2100:

a. inclination angle offsets providing pitch angle information;

b. gun pip (body x-axis) designating the direction in which the aerial vehicle body is aligned;

c. ownship or velocity direction indicating the direction in which the aircraft is flying, and is offset from the gun pip through the angles of sideslip, and angle of attack, it is also indicative of the current climb angle;

d. horizon line (zero inclination) facilitating the resolving of the current orientation of the vehicle, particularly the bank and pitch angles;

e. fall line presenting the vector describing the direction the CCIP will move, thereby assisting the pilot lineup the CCIP with a desired target;

f. boresight (head tracker centre) representing the centre of the pilot's vision, based on the position determined by the orientation sensors 2200; and g. terrain points representing a sample spread of terrain points around the current boresight ground point, and preferably around the determined CCIP and target.

The controller 5400 of the cockpit terminal 5000 is configured with software that displays a terrain map 5400 indicative of the digital terrain data, which may be in a two-dimensional or three-dimensional format. It is envisaged that, where the training aircraft has a releasable weapons rack, as well as a hardwired pickle button, then this will be used during training, however where the training aircraft is not configured to release a dummy weapon, then a virtual pickle button 5200 can be displayed on the cockpit terminal 5000, fluctuation by a user in the cockpit. The user in the cockpit of the aircraft 3000 is then able to make a judgement as to when the CCIP and the target image coincide (basing their judgement on the CCIP image and target image displayed on either the HMD display 2100 or the touchscreen display 5100 of the cockpit terminal 5000), and actuate the pickle button 5200 as a pickle input. On receiving 340 the pickle input, the cockpit terminal 5000 will transmit 350 a pickle signal to the training system 1000. On receiving 360 the pickle signal, the controller 1300 will actuate 370 the deployment of the dummy weapon 9000.

Where the training system 1000 includes a weapon rack 1600 attached to it, the controller can actuate the weapon rack 1600 by transmitting an actuation signal either along a hardwire connection, or by transmitting a wireless actuation signal that is receivable by a receiver on the weapon rack. Where a separate weapon rack 1600 is provided that is connected to its own hard point on the aircraft, the training system 1000 will preferably transmit a wireless actuation signal for actuating the deployment of the dummy weapon 9000.

In one preferred embodiment, it is envisaged that the weapon rack controller will also cause the transmission of a deployment signal confirming that the dummy weapon has been deployed.

It is further envisaged that any of the signals transmitted to or from the training system 1000 can be relayed, preferably simultaneously, to a ground based or aircraft based monitoring station 8000 for recording and assessment of the sequence by trainers training the forward controller 4000.

Further, in one embodiment it is envisaged that the designation of the target may be carried out by tracking of the "look-at" position of the HMD arrangement 2000, while actuating a virtual target designation button on the cockpit terminal 5000. The look-at position of the HMD arrangement 2000 is transmitted to the training system 1000, where the target coordinates, preferably in relative coordinates are determined by calculating the intersection of the look-at position with the digital terrain data. It is envisaged that this function may be useful in assisting in pilot training or system testing.

It is further envisaged that all of the functionality described with reference to the cockpit terminal could be carried out remotely from the ground based monitoring station 8000 via the communications network established between the training system 1000 and the ground based monitoring station 8000. In such an embodiment, a cockpit terminal 5000 may not be required. This would leave the pilot free to control the aircraft. It is further envisaged that the pilot could, in such an embodiment, be using the HMD arrangement 2000 in order to ensure that the aircraft is correctly positioned to either fly through a continuously calculated release point, or to line up the continuously calculated impact point with the target.

It is further envisaged that in HMD arrangement 2000 as described could be used in actual combat.

One problem encountered during live or training scenarios is that the front nose of an aircraft can block forward view, potentially obscuring line of sight to a target. The use of an HMD arrangement 2000 allows for more accurate targeting of the weapon and/or dummy weapon despite visual obfuscation by the nose of an aircraft.

Some aircraft, and especially, and especially combat aircraft, have heads up display arrangements on which terrain and/or CCIP or CCRP can be displayed. However, where the speeds at which the aircraft is approaching a target is too low, the CCIP/CCRP may be at too steep of an angle to be able to display on a heads up display. The provision of an HMD arrangement that can be used at any angle overcomes this problem.

It is further envisaged that all of the functionality described with reference to the cockpit terminal 5000 can be carried out on the HMD arrangement 2000. To this end, it is envisaged that the HMD arrangement 2000 could receive a determined location or target, display the target on an electronic map, transmit an authorisation signal for camera control and receive a camera view, as well as display any of the images described with reference to the cockpit terminal 5000 on the HMD display 2100.

Further, the HMD arrangement 2000 could include any number of input switches or arrangements, including buttons, touch pads, or the like, by which the user could designate a target, receive camera control authorisation input, and/or actuate release of a dummy weapon or weapon by receiving a pickle input, The HMD arrangement 2000 could further provide for transmission of any of the signals that the cockpit terminal 5000 is described as transmitting, including transmitting authorisation signals for camera control, and/or transmitting a pickle input to the training system 1000.

Interpretation

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "real-time" for example "displaying real-time data," refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'computing device', 'digital storage media', 'computer readable medium' and the like should not necessarily be construed as being a single object, and may be implemented as a two or more objects in cooperation, such as, for example, a digital storage media being construed as two or more SSD drives cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet, as well as wireless protocols used commonly in the defence industries.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) may show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

ADDITIONAL EMBODIMENTS

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

A reference to a controller being configured for carrying out a particular method can be construed as the processor of a controller being directed by software instructions stored on a digital storage media device, to cause the processor to perform the method step being described, either by acting directly, or by causing actuation of methods via other devices such as a transceiver or sensor.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention is described herein, and/or shown in the drawings, are presented by way of example only and are not limiting as to the scope of the invention. Unless otherwise specifically stated, individual aspects and components may be modified, or may have been substituted therefore known equivalents, or as yet unknown substitutes such as may be developed in the future or such as may be found to be acceptable substitutes in the future. The invention may also be modified for a variety of applications while remaining within the scope and spirit of the claimed invention, since the range of potential applications is great, and since it is intended that the present invention be adaptable to many such variations.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Chronological Order

For the purpose of this specification, where method steps are described in sequence, the sequence does not necessarily mean that the steps are to be carried out in chronological order in that sequence, unless there is no other logical manner of interpreting the sequence.

Markush Groups

In addition, where features or aspects of the invention are described in terms of Markush groups, those skilled in the art will recognise that the invention is also thereby described in terms of any individual member or subgroup of members of the Markush group.

INDUSTRIAL APPLICABILITY

It is apparent from the above, that the arrangements described are applicable to the arms supply, weapons and military support industries.

The invention claimed is:

1. An aircraft based weapon targeting training system for training a forward controller to aim weaponry that is mounted on an aircraft, the weapon targeting training system including:

a housing configured for attachment to an aircraft;

a power source housed within the housing, the power source being configured for powering the weapon targeting training system;

at least one or more transceivers housed within the housing, the at least one or more transceivers being configured for wireless communication with a surface terminal and a cockpit terminal and a helmet mounted display;

at least one or more sensors housed within the housing, the sensors being configured for detecting one or more selected from:

a location of the aircraft;

an orientation of the aircraft;

a velocity of the aircraft;

an acceleration of the aircraft;

an image from a target on the ground;

an air speed of the aircraft;

an altitude of the aircraft;

a controller housed within the housing, the controller being configured for:

storing digital terrain data;

receiving a target signal from a surface terminal, the target signal being indicative of a ground target being targeted by the forward controller;

transmitting the target signal wirelessly to the cockpit terminal in the cockpit of the aircraft; and receiving from the at least one or more sensors a positioning signal indicative of the location of the aircraft; and, optionally, one or more selected from;

an altitude signal indicative of the altitude of the aircraft;

an airspeed signal indicative of the airspeed of the aircraft;

an orientation signal indicative of the orientation of the aircraft;

a velocity signal indicative of the velocity of the aircraft;

an acceleration signal indicative of the acceleration of the aircraft;

calculating the velocity of the aircraft from the positioning signal; and calculating a weapon trajectory for a dummy weapon based on one or more selected from:

the positioning signal;

the airspeed signal;

the aircraft velocity; and the altitude of the signal;

calculating one or more selected from a continuously calculated impact point (CCIP) and a continuously calculated release point (CCRP) from the weapon trajectory and digital terrain data;

determining a CCIP display signal from the CCIP or a CCRP display signal from the CCRP and transmitting the respective one of the CCIP display signal or CCRP display signal wirelessly to the cockpit terminal (5000) or a helmet mounted display;

receiving a pickle signal from a user actuating a pickle button in response to the respective one of the CCIP display signal or CCRP display signal received at the respective one of the cockpit terminal or helmet mounted display; and actuating the release of a dummy weapon on receipt of the pickle signal.

2. The training system as claimed in claim 1, wherein the housing is configured for removable attachment to an aircraft.

3. The training system as claimed in claim 1, wherein the training system includes:

a first wireless transceiver configured for communicating with a surface terminal; and a second wireless transceiver configured for communicating with a cockpit terminal.

4. The training system as claimed in claim 1, wherein the sensor for detecting an image from a target on the ground is controllable by the controller to focus on a sensed target on the ground.

5. The training system as claimed in claim 1, wherein the digital terrain data is three-dimensional terrain data.

6. The training system as claimed in claim 1, wherein the controller is configured for:

receiving a control signal from the cockpit terminal; and controlling movement of the sensor to focus on a ground target identified by the target signal.

7. The training system as claimed in claim 6, wherein the controller is configured for:

receiving a sensor signal from the sensor focused on the ground target; and transmitting the sensor signal to the surface terminal.

8. The training system as claimed in claim 7, wherein the controller is configured for:

transmitting the sensor signal to the cockpit terminal.

9. The training system as claimed in claim 8, wherein the controller is configured for:

receiving a confirmation signal from the surface terminal.

10. The training system as claimed in claim 9, wherein the controller is configured for:

transmitting the confirmation signal to the cockpit terminal.

11. The training system as claimed claim 1, wherein the target signal includes an indication of a target location and the controller is configured for:

determining a target signal from the target location; and wirelessly transmitting the target signal to the cockpit terminal in the aircraft.

12. The training system as claimed in claim 1, wherein the weapon targeting training system includes a rack to which a dummy weapon is releasably attachable.

13. The training system as claimed in claim 12, wherein the rack is mounted to the housing.

14. A method of training a forward controller to aim weaponry mounted on an aircraft at a target, the method including the steps of:

providing a training system as claimed in claim 1;

receiving a target signal from a surface terminal;

determining a target location on a digital terrain data based on the target signal;

receiving from at least one or more sensors one or more selected from:

a positioning signal indicative of the location of the aircraft;

an altitude signal indicative of the altitude of the aircraft;

an airspeed signal indicative of the airspeed of the aircraft;

an orientation signal indicative of the orientation of the aircraft;

a velocity signal indicative of the velocity of the aircraft;

an acceleration signal indicative of the acceleration of the aircraft calculating a weapon trajectory for a dummy weapon based on one or more selected from:

the positioning signal;

the airspeed signal;

the aircraft velocity; and the altitude signal;

calculating a target solution for a dummy weapon mounted on the aircraft based on the calculated weapon trajectory and the digital terrain data; and wherein the targeting solution is one or more selected from a continuously calculated impact point (CCIP) and a continuously calculated release point (CCRP).

* * * * *